United States Patent [19]

Alberino et al.

[11] Patent Number: 4,472,341
[45] Date of Patent: Sep. 18, 1984

[54] POLYURETHANE PROCESS USING POLYSILOXANE MOLD RELEASE AGENTS

[75] Inventors: Louis M. Alberino, Cheshire; Dale F. Regelman, Wallingford; George H. Temme, North Haven, all of Conn.

[73] Assignee: The Upjohn Company, Kalamazoo, Mich.

[21] Appl. No.: 510,791

[22] Filed: Jul. 5, 1983

[51] Int. Cl.³ .................. B28B 1/24; C08G 18/14
[52] U.S. Cl. .................. 264/300; 252/182; 264/51; 264/328.6; 264/DIG. 83; 521/111; 521/112; 528/48; 528/49
[58] Field of Search .............. 521/111, 112; 252/182; 264/328.6, 300, DIG. 83, 45.5, 51; 528/48, 49; 556/427

[56] References Cited

U.S. PATENT DOCUMENTS

| | | | |
|---|---|---|---|
| 2,960,492 | 11/1960 | Morton et al. | 556/427 |
| 3,404,105 | 10/1968 | Rossmy | 521/111 |
| 3,461,148 | 8/1969 | Tamura et al. | 521/111 |
| 3,715,377 | 2/1973 | Siciliano | 556/416 |
| 3,884,860 | 5/1975 | Brown | 556/427 |
| 3,896,052 | 7/1975 | Lockwood et al. | 521/129 |
| 3,899,443 | 8/1975 | Reymore et al. | 521/162 |
| 3,903,018 | 9/1975 | Kolakowski et al. | 521/156 |
| 3,993,606 | 11/1976 | vonBonin et al. | 521/174 |
| 4,033,912 | 7/1977 | Kleimann et al. | 521/160 |
| 4,038,221 | 7/1977 | Koster et al. | 521/160 |
| 4,076,695 | 2/1978 | Keil | 528/48 |
| 4,218,543 | 8/1980 | Weber et al. | 521/51 |
| 4,220,727 | 9/1980 | Godlewski | 528/48 |
| 4,230,816 | 10/1980 | Martin | 556/427 |
| 4,269,963 | 5/1981 | Homan et al. | 556/427 |
| 4,296,212 | 10/1981 | Ewen et al. | 521/167 |
| 4,321,333 | 3/1982 | Alberino et al. | 521/159 |
| 4,342,841 | 8/1982 | Alberino et al. | 521/163 |
| 4,379,100 | 4/1983 | Salisbury et al. | 264/39 |

OTHER PUBLICATIONS

New Product Information: Dow Corning ®, Q2-7119, Fluid for RIM Internal Release, (Dow Corning Corp., Midland, Mich.).

Primary Examiner—Herbert S. Cockeram
Attorney, Agent, or Firm—James S. Rose; Denis A. Firth

[57] ABSTRACT

Disclosed is an improved process for the production of organic polyisocyanate based molded polymers prepared from at least one organic polyisocyanate and at least one polyol in the presence of an internal release agent wherein the improvement comprises employing as said agent a polysiloxane having at least one unit of the formula

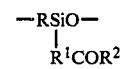

wherein R is selected from the group consisting of lower-alkyl and aryl, $R^1$ is a divalent hydrocarbon radical, and $R^2$ is selected from the group consisting of lower-alkoxy, aryloxy, particular hydroxyalkyleneoxy, alkoxyalkyleneoxy, amino, and hydroxyalkylamino radicals.

The molding process can be repeated in many cycles before the molds require cleaning or treatment with release agent. The ease and rapidity with which the present process can be carried out makes it particularly suited to RIM production methods.

23 Claims, No Drawings

POLYURETHANE PROCESS USING POLYSILOXANE MOLD RELEASE AGENTS

BACKGROUND OF THE INVENTION

1. Field of the Invention

This invention relates to an improved process for molding polyisocyanate based polymers and is more particularly concerned with improving the mold release properties of said polymers through the use of particular internal release agents.

2. Description of the Prior Art

The molding of polyisocyanate based articles both cellular and non-cellular, in a variety of shapes and using an assortment of polymer compositions and mold materials, is well known in the art. To prevent the molded pieces from sticking to the mold surfaces, mold release agents are generally employed. These agents can be in the form of external or internal release agents and it is this latter category which is preferred and which has been receiving a good deal of attention of late.

One class of internal release agents which has been found to be useful and is commercially available is the polysiloxane polymers having pendant carboxylic acid groups present along the polysiloxane backbone. Reference to such carboxy functional polysiloxanes can be found in U.S. Pat. Nos. 4,076,695, 4,220,727 and 4,379,100, and new product information bulletin "Dow Corning ®Q2-7119 Fluid for RIM Internal Release" (Dow Corning Corp., Midland, Mich.).

We have now discovered a novel class of derivatives of the aforesaid carboxy functional polysiloxanes which are possessed of highly unexpected properties to be discussed below and which impart outstanding release properties to molded polyisocyanate polymers.

SUMMARY OF THE INVENTION

This invention comprises an improved process for the production of an organic polyisocyanate based polymer in a closed mold which process comprises polymerizing a reaction mixture comprising at least one organic polyisocyanate with at least one organic polyol in the presence of an internal release agent wherein the improvement comprises employing as the internal release agent a polysiloxane having at least one unit of the formula

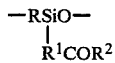
$$\begin{array}{c}-RSiO-\\|\\R^1COR^2\end{array} \qquad I$$

wherein R is selected from the group consisting of lower-alkyl and aryl, $R^1$ is a divalent hydrocarbon radical and $R^2$ is selected from the group consisting of lower-alkoxy, aryloxy, and radicals having the formulae

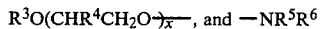
$R^3O(CHR^4CH_2O)_{\overline{x}}$—, and —$NR^5R^6$ wherein $R^3$ is selected from the group consisting of hydrogen and lower-alkyl, $R^4$ is selected from the group consisting of hydrogen and methyl, x has an average value from about 1 to about 50, $R^5$ and $R^6$ are independently selected from the group consisting of hydrogen, lower-alkyl, and the radical having the formula

$(CH_2CHR^4O)_{\overline{y}}$—H wherein $R^4$ is defined as above and y has an average value of from about 1 to about 4.

This invention also comprises a novel class of polysiloxanes having the formula

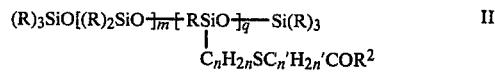
$$(R)_3SiO[(R)_2SiO]_{\overline{m}}[\underset{\underset{C_nH_{2n}SC_{n'}H_{2n'}COR^2}{|}}{RSiO}]_{\overline{q}}Si(R)_3 \qquad II$$

wherein R and $R^2$ are defined as above, m has an average value of from about 30 to about 150 and q has a value such that the unit which it characterizes represents about 1 to about 10 mole percent of the total polysiloxane.

The term "polysiloxane" has the generally accepted meaning well known to those skilled in the art and means a polymer having a MW from about 1000 to about 20,000 and comprised of predominantly linear chains of organosiloxane units having the generalized formula

$$R_zSiO_{\frac{4-z}{2}} \qquad III$$

wherein R is defined above and z is an integer from 1 to 3, inclusive. It will be obvious to one skilled in the art that those organosiloxane units having z=3 are representative of polymer chain ending units while those units having z=2 represent the majority of the recurring units which are difunctional units and z=1 represents branch units which can occur along the polymer chain. The polysiloxanes in accordance with the present invention have at least one of the difunctional units (III) defined above in any given polysiloxane chain replaced by the unit (I) set forth above.

The term "lower-alkyl" means alkyl having from 1 to 8 carbon atoms, inclusive, such as methyl, ethyl, propyl, butyl, pentyl, hexyl, heptyl, octyl, and isomeric forms thereof.

The term "aryl" means the radical obtained by removing one nuclear hydrogen atom from an aromatic hydrocarbon having from 6 to 12 carbon atoms, inclusive, and is inclusive of phenyl, tolyl, xylyl, naphthyl, biphenylyl, and the like.

The term "divalent hydrocarbon radical" means the radical obtained by removing two hydrogen atoms from a parent hydrocarbon having a carbon atom content of from 2 to 12 inclusive and which may contain oxygen or sulfur atoms. Illustrative of such radicals are lower-alkylene, arylene, cycloalkylene, —$C_nH_{2n}OC_{n'}H_{2n'}$—, and —$C_nH_{2n}SC_{n'}H_{2n'}$— wherein —$C_nH_{2n}$— and —$C_{n'}H_{2n'}$— each represent alkylene and together have the same total carbon atom limitation set forth above for the divalent hydrocarbon radical.

The term "lower-alkylene" means straight or branched chain alkylene having from 2 to 8 carbon atoms, inclusive, such as ethylene, propylene, butylene, pentylene, hexylene, heptylene, octylene, and isomeric forms thereof.

The term "arylene" means arylene having 6 to 12 ring carbon atoms, inclusive, such as phenylene, tolylene, xylylene, naphthylene, biphenylylene, and the like.

The term "cycloalkylene" means cycloalkylene having from 4 to 8 ring carbon atoms, inclusive, such as 1,3-cyclobutylene, 1,3-cyclopentylene, 1-methyl-2,4-cyclopentylene, 1,3-cyclohexylene, 1,4-cyclohexylene, 1-methyl-2,4-cyclohexylene, 1,4-cycloheptylene, 1,4-cyclooctylene, and the like.

The divalent radical —$C_nH_{2n}OC_{n'}H_{2n'}$— has the total carbon atom limitation set forth above and typically includes such radicals as 2-oxapropylene, 2-oxabutylene, 3-oxapentylene, 2-oxapentylene, 2-oxahexylene, 4-oxaheptylene, 3-oxa-2,4-dimethylpentylene, and the like.

The divalent radical —$C_nH_{2n}SC_{n'}H_{2n'}$— has the total carbon atom limitation set forth above and typically includes such radicals as 2-thiapropylene, 2-thiabutylene, 3-thiapentylene, 2-thiapentylene, 2-thiahexylene, 4-thiaheptylene, 3-thia-2,4-dimethylpentylene, and the like.

The term "lower-alkoxy" means alkoxy having from 1 to 8 carbon atoms, inclusive, such as methoxy, ethoxy, propoxy, butoxy, pentyloxy, hexyloxy, heptyloxy, octyloxy and the like, including isomeric forms thereof.

The term "aryloxy" means aryloxy having the same carbon atom limitation set forth above for aryl, and is inclusive of phenoxy, naphthyloxy, biphenyloxy, and the like.

DETAILED DESCRIPTION OF THE INVENTION

Various types of systems for polyisocyanate based polymers can be employed in the process in accordance with the present invention. Typical, but not limiting thereof, are the systems for molded polyurethanes, polyurethane-polyureas, polyisocyanurates, polyurethane-polyisocyanurates, polyamide-polyurethanes, etc. For illustrative and detailed teaching in regard to the preparation of molded polyurethanes including reactants and various molding procedures, reference is made to the prior art cited supra, and, additionally, U.S. Pat. Nos. 3,993,606, 4,033,912 and 4,038,221, all of whose disclosures relative thereto are hereby incorporated herein by reference. Also incorporated herein by reference for typical molded polyisocyanurate preparations are U.S. Pat. Nos. 3,896,052, 3,899,443 and 3,903,018.

In carrying out the preparation of the molded polymers in accordance with the present invention any of the molds and materials employed conventionally in the construction of said molds can be employed. Advantageously, the molds are fabricated from metals such as cast aluminum, steel, steel alloys, stainless steel, chrome-alloys, electroform nickel/copper, and the like.

The preferred type of systems for polyisocyanate based polymers for use in the process in accordance with the present invention are the systems for polyurethane based polymers including those polymers which additionally include polyurea linkages and polyisocyanurate linkages in conjunction with the polyurethane. A preferred means for molding the polyurethanes in accordance with the present invention is by the RIM method. For specific teaching directed to the preparation of polyurethanes by the RIM method see U.S. Pat. Nos. 4,218,543; 4,296,212; 4,321,333 and 4,342,841 whose respective disclosures are herein incorporated by reference.

The novelty in the present invention resides in the use, as an internal release agent in the preparation of the above molded polymers, of a polysiloxane containing at least one of the siloxane groups (I) defined above.

Preferably, the polysiloxanes for use in accordance with the present invention are the linear polysiloxanes having the formula

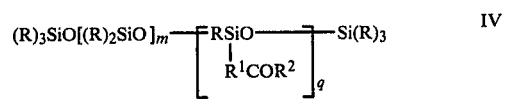

which formula includes the novel polysiloxanes of formula (II) set forth above, wherein R, $R^1$, and $R^2$ are defined above, m has an average value of from about 30 to about 150 repeating units, and q has a value such that the unit which it characterizes represents about 1 to about 10 mole percent of the total polysiloxane.

In respect of the radical R of formula (IV), loweralkyl defined above is preferred with the species methyl being most preferred.

In respect of the divalent radical $R^1$ of formula (IV) defined above the preferred classes comprise loweralkylene, —$C_nH_{2n}OC_{n'}H_{2n'}$— and —$C_nH_{2n}SC_{n'}H_{2n'}$—.

In respect to the radical $R^2$ of formula (IV) the preferred classes comprise lower-alkoxy, alkyleneoxy having the formula

and —$NR^5R^6$ wherein $R^3$, $R^4$, $R^5$, $R^6$, are defined above, and x has an average value from about 1 to about 15.

Preferred values for m fall within the average range of about 50 to about 100 repeating units. The preferred values for q are such that the units which they represent comprise about 2 to about 4 mole percent of the total polysiloxane.

Illustrative of preferred species of the polysiloxanes (IV) for use in accordance with the present invention are the following novel polysiloxanes wherein R=methyl, m=about 95, q=about 3, $R^1$=—$CH_2CH_2SCH_2$—, and $R^2$ is one of the following radicals: methoxy, ethoxy, β-methoxydiethyleneoxy, β-ethoxydiethyleneoxy, β-butoxydiethyleneoxy, methoxyethyleneoxy of molecular weight from about 250 to about 1000, β-hydroxyethyleneoxy, β-hydroxyisopropyloxy, ω-hydroxypolypropyleneoxy of MW from about 300 to about 1000, —$N(CH_2CH_2OH)_2$, —$N(CH_2CH_2OCH_2CH_2OH)_2$, and —$N(CH_2CHCH_3OH)_2$.

Most preferred of the above novel polysiloxanes are those wherein $R^2$ is methoxy, β-ethoxydiethyleneoxy, methoxyethyleneoxy of MW about 350, β-hydroxyisopropyloxy, and —$N(CH_2CH_2OH)_2$.

The release agents can be added to the polymer forming ingredients in any manner desired. In the event that a polyol ingredient be present, the release agent can be added to either the A side (isocyanate) or B side (polyol) either during the actual polymer preparation, or, alternatively, premixed with either the A or B components to form a stable blend.

Surprisingly, it has been found in one of the preferred embodiments of the present process that, when the release agent is employed as a premix in the A side, polymers are obtained which have, generally speaking, superior properties to those polymers wherein the release agent was employed in the B side.

Alternatively, if it be so desired the release agent may be added separately to the reaction mixture.

The actual amount of release agent to be used will vary according to the particular polymer formulation and release agent being employed, and, more particularly, the mold configuration. However, it is used in only minor amounts and those amounts are easily determined by one skilled in the art using trial and error experiments. The term "minor amount" means an amount sufficient to provide multiple mold releases before the mold requires any cleaning or other surface treatment including the use of a mold release agent on the mold surface.

Generally speaking, the polysiloxane release agent is employed within the range of from about 0.25 percent to about 10 percent by weight based on the total formulation weight, preferably from about 0.5 to about 8 percent, and, most preferably from about 1 to about 5 percent by weight.

It has already been noted above that the properties of the polyurethane polymers molded in a preferred embodiment of the present process (release agent in A side) are actually superior to the polymers molded with the release agent in B side. In this connection, it has been found that liquid organic polyisocyanates form highly stable and homogeneous emulsion blends with the polysiloxane release agents in accordance with the present invention. The length of time for which the blends remain homogeneous is quite surprising and if there is any separation or settling out of the components the homogeneity is easily restored by simple mixing or shaking of the isocyanate and release agent.

Contrastingly, the prior art carboxy functional polysiloxanes cannot be employed in the A side. Any attempt to form an emulsion type blend of a carboxy functional polysiloxane with an isocyanate leads to a complete breakdown of the initial emulsion blend a few days later resulting in the formation of a rubbery gelatinous side-product which cannot be reemulsified. When such a reactive blend is freshly prepared and its gel time determined in a model polyurethane system before any rubbery precipitates can form, it still is characterized by excessively long gel times. Consequently, the use of such a prior art polysiloxane release agent in the A side is, generally speaking, not possible.

Also, the present molded polymer forming process can be carried out using the concentrations of catalyst components generally accepted in the art for such polyisocyanate based polymerizations. This is in contrast to those processes wherein the prior art carboxy functional polysiloxanes are employed which call for additional catalyst to offset the retarding affect the carboxyl groups have on the known catalysts (see the Dow Corning Q2-7119 bulletin cited supra).

In yet another advantageous feature, the molded polyurethanes prepared in accordance with the present invention possess a high degree of paintability.

Furthermore, the release agents employed in accordance with the present invention are, by themselves, possessed of excellent stability on prolonged storage.

Both the known and novel polysiloxanes to be used in accordance with the present invention are readily obtained using standard preparative methods well known to those skilled in the art. The following schematic equation represents the general preparative procedure wherein a carboxy functional polysiloxane containing at least one unit of the formula (V) is reacted with at least one molar equivalent of a reactant (VI) to produce a polysiloxane having at least one unit of formula (I).

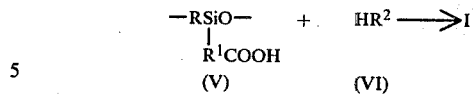

$R$, $R^1$ and $R^2$ are defined as above.

Generally speaking, the carboxy functional polysiloxanes (V) are readily available either commercially or by simple preparative methods set forth in U.S. Pat. No. 3,715,377 whose disclosure relative thereto is hereby incorporated herein by reference.

When $R^2$ is alkoxy, aryloxy, alkoxyalkyleneoxy or hydroxyalkyleneoxy, then the reaction is simply an esterification wherein (VI) is the corresponding alcohol. When $R^2$ is $-NR^5R^6$ then the reaction is simply an ammonolysis reaction.

In the esterification procedure between the acid (V) and the corresponding alcohol (VI) typical, but not limiting of the alcohols are methanol, ethanol, propanol, butanol, and the like; phenol, cresol, naphthol, and the like; monomethyl-, monoethyl-, monobutyl ethers of ethylene glycol, monomethyl-, monoethyl-, monobutyl ethers of diethylene glycol, monomethyl, monoethyl-, monobutyl ethers of a polyethylene glycol having a molecular weight or average molecular weight falling within a range of from about 160 to about 1000, monomethyl-, monoethyl, monobutyl ethers of a polypropylene glycol having a molecular weight or average molecular weight falling within a range of from about 200 to 1200, or monomethyl-, monoethyl-, monobutyl ethers of polyethyleneoxypolypropyleneoxy glycols, and the like; ethylene glycol, 1,2-propanediol (propylene glycol), diethylene glycol, dipropylene glycol, polyethylene glycols having an average MW from about 160 to about 1000, polypropylene, and mixed polyethylenepolypropylene glycols falling within a MW range of about 160 to about 1000; and the like.

The esterification can be carried out using any of the standard procedures well known to those skilled in the art. For example, the polysiloxane containing the acid unit(s) can be reacted directly with the corresponding alcohol and water removed. Alternatively, and, preferably, the acid can be first esterified with methanol and then a transesterification effected between (VI) and the methyl ester of (V). In yet another method (V) and (VI) can be reacted in the presence of a sorbent acid catalyst system as taught in U.S. Pat. No. 3,715,377 whose disclosure in respect thereof is incorporated herein by reference.

In the event $R^2$ is $-NR^5R^6$ then it is easier to employ the carboxypolysiloxane in the form of the methyl ester to allow for a more facile reaction with the corresponding amine (VI). Typical, but not limiting of the amines are ammonia, methylamine, ethylamine, propylamine, butylamine, pentylamine, hexylamine, heptylamine, octylamine, dimethylamine, diethylamine, dipropylamine, dibutylamine, dipentylamine, dihexylamine, diheptylamine, dioctylamine, diisopropylamine, diisobutylamine and the like; ethanolamine, diethanolamine, bis(hydroxyethyleneoxyethyl)amine, bis(hydroxydiethyleneoxyethyl)amine, and the like. The amines and (V) are simply heated and either water or alcohol is removed during the course of the reaction until completed.

The novel polysiloxanes (II) in accordance with the present invention are simply prepared by reacting the carboxy functional polysiloxane having the formula

wherein R, m, q, $C_nH_{2n}$ and $C_n'H_{2n}$ are defined as above with (VI) in accordance with the above described preparative methods.

The improved molding process in accordance with the present invention is not limited to any particular polyisocyanate based polymer nor is it limited to any particular molding procedure as discussed hereinabove.

However, as noted above, the preferred polymers for preparation in accordance with the present invention are the polyurethane moldings and particularly the polyurethane elastomers prepared by the RIM procedure.

A particularly preferred system for a RIM molded polyurethane elastomer in accordance with the present invention comprises a polysiloxane release agent in accordance with the present invention in combination with (A) an organic polyisocyanate; (B) an organic polyol having a MW from about 1500 to about 12,000 and a functionality of from about 2 to about 4; (C) a difunctional extender; and (D) a polyurethane catalyst, wherein the equivalent proportions of said polyol (B) to said extender (C) is within the range of about 1:4 to about 1:40 and the ratio of isocyanate equivalents of (A) to the total active hydrogen equivalents of said (B) and said (C) is from about 0.95 to about 1.5.

It should be noted that in those polysiloxanes in accordance with the present invention which carry active hydrogens, for the most part, the hydrogen equivalents are small and can be ignored when calculating isocyanate to active hydrogen ratios. However, if sufficiently high so as not to be ignored then the value can be included within the above ranges.

Any of the polyisocyanates, polyols, difunctional extenders, and catalysts disclosed in the references cited supra and incorporated by reference herein can be employed in the above preferred formulation.

Other optional additives such as dispersing agents, cell stabilizers, surfactants, flame retardants, colorants, and the like can be added to the polyurethane polymers in accordance with the present invention.

The molding process in accordance with the present invention can be repeated in an unexpectedly high number of molding cycles before any mold surface treatment is required and the molds can be opened easily. Consequently, these advantages speed up a production line, cut down on reject rate, and thereby lead to considerable economic advantage.

Accordingly, the process for making molded polyurethane articles in accordance with the present invention is useful, inter alia, for the preparation of solid cast elastomers, solid and microcellular RIM elastomers, and elastoplastics. The molded products find particular utility as auto parts such as car bumpers, body elements, panels, doors, engine hoods, skirts, air scoops, and the like. Further, the thermosetting nature of the present polymers results in their good high temperature performance characteristics which make them suitable for industrial elastomer applications where high temperature resistance is needed such as in paint drying chambers.

The following examples describe the manner and process of making and using the invention and set forth the best mode contemplated by the inventors of carrying out the invention but are not to be construed as limiting.

EXAMPLE 1

A 500 ml. three-neck flask fitted with a stirrer, thermometer, and condenser fitted with a Dean-Stark trap filled with 3 Å molecular sieves was charged with 50 g. (0.018 eq.) of a carboxy functional siloxane having the formula

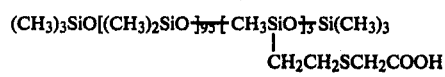

(identified as Q2-7119 and supplied by Dow Corning Corp., Midland, Mich.) dissolved in 100 ml. of toluene, 100 ml. methanol, and 10 drops of methanesulfonic acid.

The solution was stirred and heated under reflux (65° C.) overnight. The excess methanol was removed by distillation leaving a toluene solution which was cooled and then extracted with 50 ml. of dilute aqueous sodium bicarbonate. The organic layer was separated and dried over magnesium sulfate. Toluene was removed in a rotary evaporator (under about 10 mm. of mercury pressure) to yield 37.9 g. of an oil residue. Thus there was obtained a polysiloxane in accordance with the present invention (Formula II) having the formula

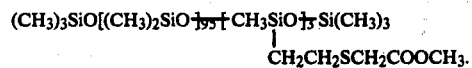

Nuclear magnetic resonance (NMR) analysis confirmed the structure of the polysiloxane.

EXAMPLE 2

A 12 liter reaction flask equipped with a stirrer, thermometer, and condenser fitted with a Dean-Stark trap was charged with 4392.5 g. (1.57 eq.) of the carboxy functional siloxane described in Example 1, 900 ml. methanol, 4.4 g. of conc. sulfur acid, 3500 ml. of toluene, and 515 g. (3.84 eq.) of the monoethyl ether of diethylene glycol.

The solution was stirred and heated under reflux (about 65° C.) for about 6 hours and the water of reaction removed from the trap. The reaction solution was cooled to room temperature and the methanol and toluene were removed by distillation until the pot temperature reached 160° C. The residue was cooled to 120° C. and then distilled under 0.5 mm. of mercury pressure until the pot temperature reached 165° C. The residue liquid was stirred overnight with 3.5 g. of calcium hydroxide and then filtered through a centrifugal filter to yield 4022 g. of a polysiloxane in accordance with the present invention (Formula II) having the formula

NMR analysis confirmed the structure of the polysiloxane.

EXAMPLE 3

The apparatus described in Example 2 was charged with 5233 g. (1.89 eq.) of the carboxy functional siloxane described in Example 1, 1020 g. of the monomethyl ether of a polyethyleneoxy glycol (average MW of the monoether glycol is about 350), 950 ml. methanol, 4.75 g. of conc. sulfuric acid, and 3000 ml. toluene.

The solution was heated to reflux (about 65° C.) for about 8 hours and the water of reaction removed from the trap. The reaction solution was treated as described in Example 2 and thus there was obtained 5465 g. of a polysiloxane in accordance with the present invention (Formula II) having the formula

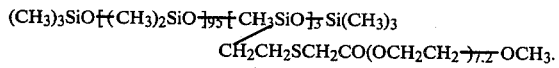

NMR analysis confirmed the structure of the polysiloxane.

EXAMPLE 4

The apparatus described in Example 2 was charged with 5092.6 g. (1.8 eq.) of the carboxy functional siloxane described in Example 1, 5.09 g. of conc. sulfuric acid, 1000 ml. of methanol, and 3500 ml. of toluene.

The solution was heated to reflux (70° to 75° C.) over a period of about 16 hours to form the methyl ester of the carboxy units in the siloxane. Then 302 g. (2.9 eq.) of diethanolamine was added and the methanol removed by distillation raising the pot temperature to 120° C. over a 2 hour period. Then 2000 ml. of toluene was removed by raising the pot temperature to 130° C. The resulting solution was refluxed over the Dean-Stark trap (empty of sieves) for 1 hour. A 3.5 g. portion of calcium hydroxide was added and the distillation continued until no more toluene distilled over (pot temperature was now 150° to 160° C.). Vacuum was applied slowly at first to 20 mm. of mercury pressure then to 2 mm. and heating from 120° C. (after initial vacuum application) to 160° C. The pot residue was allowed to cool and then filtered through Celite to provide 4319 g. of a polysiloxane in accordance with the present invention (Formula II) having the formula $(CH_3)_3SiO[(CH_3)_2SiO]_{195}[CH_3SiO]_{13}Si(CH_3)_3$
$\quad\quad\quad\quad\quad\quad\quad\quad\quad\quad\quad |$
$\quad\quad\quad\quad\quad\quad\quad\quad\quad\quad\quad CH_2CH_2SCH_2CON(CH_2CH_2OH)_2.$ NMR analysis confirmed the structure of the polysiloxane.

EXAMPLE 5

The apparatus described in Example 1 was charged with 120 g. (0.043 eq.) of the carboxy functional siloxane described in Example 1, 6.5 g. (0.085 mole) of 1,2-propanediol, 25 ml. methanol, 100 ml. toluene, and 0.11 g. conc. sulfuric acid.

The solution was heated under reflux (60° to 65° C.) over the Dean-Stark trap packed with 3 Å molecular sieves for 4.5 hours. The methanol was distilled off raising the temperature to 120° C. from 80° C. The toluene was then removed first by distillation under atmospheric pressure followed by a pressure of 0.3 mm. of mercury until the pot temperature was 160° C. The residue was cooled and stirred overnight with 0.1 g. of calcium hydroxide. The residue was filtered to yield 96 g. of a polysiloxane in accordance with the present invention (Formula II) having the formula

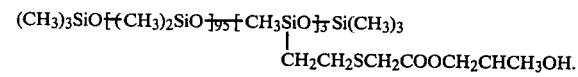

$\quad\quad\quad\quad\quad\quad\quad\quad\quad\quad |$
$\quad\quad\quad\quad\quad\quad\quad\quad\quad\quad CH_2CH_2SCH_2COOCH_2CHCH_3OH.$ NMR analysis confirmed the structure of the polysiloxane.

EXAMPLE 6

The following experiment sets forth a comparison of the stability and reactivity of an emulsion blend of a polyisocyanate with a polysiloxane release agent in accordance with the present invention (blend A) and an emulsion blend of the same polyisocyanate with a carboxy functional release agent of the prior art (blend B) both blends containing their respective release agents at about 3 percent by weight.

The blends were prepared in a 2000 ml. kettle under an argon atmosphere. The isocyanate employed was a liquid isocyanate (I.E.=180) preformed from 4,4'-methylenebis(phenyl isocyanate) and a mixture of a minor amount of dipropylene and tripropylene glycol (1000 g. for blend A and 889.96 g. for blend B). The isocyanate was preheated during stirring to 80° C. with a thermocontrolled oil bath.

In A, 30 g. of the polysiloxane prepared in accordance with Example 2 was added to the rapidly stirred isocyanate while in B, it was 26.7 g. of the carboxy polysiloxane described in Example 1 (Q2-7119) which was added. Stirring was continued in both blends at 80° C. for 20 minutes after addition. The latter prolonged stirring was carried out to assist in the formation of the milky-white emulsion.

The blends were cooled to ambient temperature (about 20° C.) under argon and then transferred to glass jars having screw caps sealed with Parafilm (a protective paraffin sheeting supplied by American Can Company, Marathon Products, Neenah, Wis.) for storage at the ambient temperature.

The reactivities of the blends in respect of polyurethane formation were measured right after preparation by manually and rapidly mixing, in a beaker, in the following proportions by weight 20 parts of SF-6503 (a 6500 MW polypropyleneoxy-polyethyleneoxy triol, OH EW=2100, supplied by Texaco Chemical Co.); 20 parts of ethylene glycol; 2 drops of dibutyl tin dilaurate; and 25.2 parts of blend A and blend B respectively. The time after initial mixing which elapsed before the stirred mixture began to gel and thereby prevent stirring was taken as the gel time. A control was also run by replacing the 25.2 parts of the blend component by the isocyanate used to prepare the above blends. The following gel times were observed.

Control: 20 seconds
Blend A: 21 seconds
Blend B: >5 minutes.

Obviously, the above gel times show that blend A shows no real difference over the control. However, blend B even after being heated during the emulsion preparation still had sufficient carboxyl function to severely retard the reaction.

The results of the storage stability of the two blends are set forth in the following tabulation. One sample of each blend was stored in an undisturbed manner, that is to say it was left standing without being touched or shaken and observed accordingly. A second sample of each blend was picked up, observed, and shaken to determine the extent to which the state of emulsion could be restored.

In blend B, after 5 days, in the stationary sample, gas evolution could be clearly seen throughout the sample even though emulsion separation was not extreme. However, the true state of the blend was readily seen when the other blend B sample was shaken and the consistency of the milky portion of the emulsion was revealed. Rubbery, gelatinous solids were present which signified either the degradation of the polysiloxane and/or the copolymerization of the isocyanate with the polysiloxane. Whatever was occurring, it rendered such a blend useless for the preparation of a polyisocyanate based polymer. A state of emulsion could not be restored by shaking the sample. The extent of the degradation simply increased after 9 days.

Contrastingly, no such degradation as seen above could be detected in blend A and when the emulsion started to separate it was easily restored by shaking the sample. In fact, it can be noted from the tabulation that after the first shaking at the 3 day mark that blend stood for at least an additional 19 days (22−3) with no separation. Somewhere between the 22 and 67 day marks the emulsion started to settle but was easily restored on the 67th day by shaking.

weight of this liquid product was 143.7 and contained about 0.056 equivalent or carbodiimide.

The B component charged to a second tank contained a blend in the following proportional parts: 100 parts of SF-6503 (a 6500 MW polypropyleneoxy-polyethyleneoxy triol, OH EW=2100, supplied by Texaco Chemical Co.); 20 parts of ethylene glycol; 0.15 part of dibutyl tin dilaurate; and 0.10 part of a surfactant which is a proprietary blend of alkylarylsulfonate and alkoxylated alcohols (supplied by Arjay, Inc., Houston, Tex.)

The different internal release agents were each employed at 3.5 parts (1.5 percent of the total formulation) and mixed in either the A or B component tank as set forth below.

In all five series 107.2 proportional parts of A component were reacted with the B component proportions set forth above so that the overall index of isocyanate to hydroxyl was 1.07. The A and B component temperatures were 100° to 120° F. and 115° to 130° F. respectively. Metering pumps from each tank were used to deliver the ingredients into the impingement mixing head to the RIM machine. After mixing, the reaction mixture was directed into a metal mold measuring 12"×8"×⅛" which was at a mold temperature of 150° F. Before the beginning of each series of moldings the

|  | Blend A | | Blend B | |
| --- | --- | --- | --- | --- |
| Days | Undisturbed | Shaken | Undisturbed | Shaken |
| 0 | milky-white emulsion | milky-white emulsion | milky-white emulsion | milky-white emulsion |
| 1 | no change | no change | starting to separate from bottom | starting to separate from bottom |
| 3 | emulsion starting to separate from bottom | emulsion starting to separate from bottom, easily reformed by shaking | | |
| 5 | | | half-inch separation from bottom, lot of gas bubbles on wall | lot of emulsion separation, rubbery gelatinous solids present clinging to walls, cannot be shaken back to emulsion |
| 9 | | | 1 inch separation from bottom, ring of gelatinous solids on top | ring of hard solid on top, rubbery solids floating in blend, emulsion cannot be reformed |
| 10 | third from bottom separated | no separation | | |
| 22 | ¼" of white band on top of hazy solution | no separation | | |
| 67 | no change from above | emulsion very slowly separating from bottom, easily reformed by shaking | | |

EXAMPLE 7

The following five series (A through E) of molded polyurethane plaques were prepared using a small reaction injection molding machine. Series A, B and C are in accordance with the present invention while D and E are not.

One tank of the RIM machine was charged with the A component which was a modified liquid methylenebis(phenyl isocyanate) (MDI) obtained by treating an MDI comprised of about 94 percent by weight of the 4,4'-isomer and 6 percent of the 2,4'-isomer in accordance with U.S. Pat. No. 3,384,653 so that about 9.6 percent of the original isocyanate groups were consumed to form carbodiimide. The isocyanate equivalent mold was preconditioned in the following way. It was first cleaned with a mold cleaner (Mold Wiz, a mold cleaner supplied by Axel Corp., Woodside, N.Y.). Then an external mold release (XMR-136, mold wax release supplied by Chem Trend Co., Howell, Mich.) was applied and the mold surfaces buffed. The application of XMR-136 and buffing was repeated. No other treatment was given to the mold once the respective molding series began.

The number of trouble-free consecutive moldings which could be carried out in accordance with the present invention was found to be so high that an arbitrary number of 40 moldings was chosen as the limit for each series. Upon demolding each plaque, it was observed for any deposition of material upon mold surfaces and whether the plaque released easily.

The molded plaques were cured at 250° F. for 1 hour prior to being subjected to any testing procedures.

In series A the internal release was the carbityl ester of the carboxy functional polysiloxane prepared in accordance with Example 2 and it was used in the A side. Parts did not adhere to the mold at all throughout the 40 moldings. Slight deposition on the non-show surface side of the mold opposite the gate was noted but this had no effect on demolding.

In series B the internal release was the methoxypolyethylene glycol ester of the carboxy functional polysiloxane prepared in accordance with Example 3 and it was used in the B side. Release was good throughout the 40 moldings. Skinning or deposition of a film was noted for most parts on the non-show surface side of the mold. This skinning was easily avoided in series C below.

In series C the same internal release that was used in series B was employed but this time in the A side. Release was good throughout the 40 moldings with little or no deposition throughout the entire run. Slight deposition on the non-show surface appeared at part 6 but disappeared as the moldings continued.

In series D the internal release was an ethoxylated sorbitan trioleate having an OH EW=1200 and was used in the B side. The 40 moldings released without any adhesion. A slight deposition was noted with part 19 which did not worsen until part 32.

In series E the internal release was a polysiloxane release agent identified as E-5356-13510 (supplied by Dow Corning, Midland, Mich.) having an OH EW=2250 but containing no ester or amide groups and was used in the B side. Release was good for all the parts. Deposition appeared only on the non-show surface along edges of part. Raising the mold temperature to 170° F. removed the deposition.

The samples of the plaques were cured as described above and subjected to the tests set forth in Table I.

| Plaque Series | A | B | C | D | E |
|---|---|---|---|---|---|
| Density, g./cc. | 1.095 | 1.053 | 1.116 | 0.936 | 1.076 |
| Hardness Shore D | 55 | 56 | 59 | 57 | 59 |
| % Elongation @ Break | 230 | 220 | 260 | 180 | 250 |
| Tensile Str. (psi) | 3640 | 3300 | 3920 | 2970 | 3670 |
| Tensile Set % | 60 | 60 | 70 | 50 | 70 |
| Die "C" Tear (pli) | 630 | 530 | 640 | 490 | 560 |
| Split Tear (pli) | 170 | 148 | 220 | 140 | 178 |
| Flex Modulus, psi | 36,760 | 29,480 | 39,710 | 26,820 | 36,890 |
| Flex Str. (psi) | 2020 | 1680 | 2160 | 1570 | 2020 |

A comparison of the properties of the D series with the B series (almost identical density and particularly hardness) shows an across-the-board superiority of the latter series. Likewise, a comparison of the E series with the C series at identical hardness shows the superiority of the latter.

Additionally, it is noted that even within the series B and C, the properties of the C series are superior to those of the B series which parallels the superior demolding results noted above when the release agent was used in the A component rather than the B component.

EXAMPLE 8

Using the apparatus, ingredients, and procedure described in Example 7, the bis(hydroxyethyl)amide of the carboxy functional polysiloxane prepared in accordance with Example 4 was used in the B component at 1.5 percent by weight concentration of the total formulation.

The series of 40 moldings was made with release being very good. A small strip of deposition appeared on the show surface near the edge of the plaque in part 30 but did not increase.

We claim:

1. In a process for the production of an organic polyisocyanate based polymer in a closed mold which process comprises polymerizing a reaction mixture comprising at least one organic polyisocyanate with at least one organic polyol in the presence of an internal release agent the improvement which comprises employing as the internal release agent a polysiloxane as a premix with the polyisocyanate said polysiloxane having at least one unit of the formula

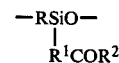

wherein R is selected from the group consisting of lower-alkyl and aryl, $R^1$ is a divalent hydrocarbon radical which may contain oxygen or sulfur atoms and $R^2$ is selected from the group consisting of lower-alkoxy, aryloxy, and radicals having the formula

wherein $R^3$ is selected from the group consisting of hydrogen and lower-arkyl, $R^4$ is selected from the group consisting of hydrogen and methyl, x has an average value from about 1 to about 50.

2. A process according to claim 1 wherein R in formula (I) is lower-alkyl.

3. A process according to claim 2 wherein R is methyl.

4. A process according to claim 1 wherein $R^1$ in formula (I) is $-C_nH_{2n}SC_{n'}H_{2n'}-$ wherein $-C_nH_{2n}-$ and $-C_{n'}H_{2n'}-$ each represent alkylene and together have a total of 2 to 12 carbon atoms in the chain.

5. A process according to claim 1 wherein $R^2$ in formula (I) is lower-alkoxy.

6. A process according to claim 1 wherein $R^2$ in formula (I) is

wherein $R^3$ is selected from the group consisting of hydrogen and lower-alkyl, $R^4$ is selected from the group consisting of hydrogen and methyl, and x has an average value of from about 1 to about 50.

7. A process according to claim 6 wherein $R^3$ is hydrogen and x has an average value of from about 1 to about 15.

8. A process according to claim 6 wherein $R^3$ is lower-alkyl and x has an average value of from about 1 to about 15.

9. In a process for the production of an organic polyisocyanate based polymer in a closed mold which process comprises polymerizing a reaction mixture comprising at least one organic polyisocyanate with at least one organic polyol in the presence of an internal release agent the improvement which comprises employing as the internal release agent a polysiloxane having at least one unit of the formula $$-\underset{\underset{R^1CONR^5R^6}{|}}{RSiO}-$$

wherein R is selected from the group consisting of lower-alkyl and aryl, $R^1$ is a divalent hydrocarbon radical which may contain oxygen or sulfur atoms and wherein $R^5$ and $R^6$ are independently selected from the group consisting of hydrogen, lower-alkyl, and the radical having the formula $$-(CH_2CHR^4O)_y-H$$

wherein $R^4$ is selected from the group consisting of hydrogen and methyl and y has an average value of from about 1 to about 4.

10. A process according to claim 9 wherein $R^5$ and $R^6$ are both radicals having the formula $$-(CH_2CH_2O)_y-H$$

wherein y has an average value of from about 1 to about 4.

11. In a process for the production of a polyurethane elastomer molding by the reaction injection molding of a reactant mixture comprising an organic polyisocyanate, at least one organic polyol and a difunctional extender in the presence of an internal release agent the improvement which comprises employing as the internal release agent a polysiloxane as a premix with the polyisocyanate said polysiloxane having the formula $$(R)_3SiO[(R)_2SiO]_m-\left[\underset{\underset{R^1COR^2}{|}}{RSiO}\right]_q-Si(R)_3 \quad IV$$

wherein R is selected from the group consisting of lower-alkyl and aryl, $R^1$ is a divalent hydrocarbon radical which may contain oxygen or sulfur atoms and $R^2$ is selected from the group consisting of lower-alkoxy, aryloxy, and radicals having the formula $$R^3O(CHR^4CH_2O)_x-,$$

wherein $R^3$ is selected from the group consisting of hydrogen and lower-alkyl, $R^4$ is selected from the group consisting of hydrogen and methyl, x has an average value from about 1 to about 15, m has an average value of from about 30 to about 150 and q has a value such that the unit which it characterizes represents about 1 to about 10 mole percent of the total polysiloxane.

12. A process according to claim 11 wherein R is methyl and $R^1$ is $-C_nH_{2n}SC_{n'}H_{2n'}-$ wherein $-C_nH_{2n}-$ and $-C_{n'}H_{2n'}-$ each represent alkylene and together have a total of 2 to 12 carbon atoms in the chain.

13. A process according to claim 12 wherein $R^1$ has the formula $-CH_2CH_2SCH_2-$.

14. A process according to claim 13 wherein $R^2$ is lower-alkoxy.

15. A process according to claim 13 wherein $R^2$ is $$R^3O(CHR^4CH_2O)_x-$$

wherein $R^3$ is lower-alkyl, $R^4$ is hydrogen, and x has an average value from about 1 to about 15.

16. A polysiloxane having the formula $$(R)_3SiO[(R)_2SiO]_m-\left[\underset{\underset{C_nH_{2n}SC_{n'}H_{2n'}COR^2}{|}}{RSiO}\right]_q-Si(R)_3 \quad II$$

wherein R is selected from the group consisting of lower-alkyl and aryl, $-C_nH_{2n}-$ and $-C_{n'}H_{2n'}-$ each represent alkylene and together have a total of 2 to 12 carbon atoms in the chain, $R^2$ is selected from the group consisting of lower-alkoxy, aryloxy, and radicals having the formulae $$R^3O(CHR^4CH_2O)_x-, \text{ and } -NR^5R^6$$

wherein $R^3$ is selected from the group consisting of hydrogen and lower-alkyl, $R^4$ is selected from the group consisting of hydrogen and methyl, x has an average value of from about 1 to about 50, $R^5$ and $R^6$ are independently selected from the group consisting of hydrogen, lower-alkyl, and the radical having the formula $$-(CH_2CHR^4O)_y-H$$

wherein $R^4$ is defined above, and y has an average value of from about 1 to about 4, m has an average value of from about 30 to about 150 and q has a value such that the unit which it characterizes represents about 1 to about 10 mole percent of the total polysiloxane.

17. A polysiloxane according to claim 16 wherein R is methyl, m=about 95, q=about 3, and said $-C_nH_{2n}SC_{n'}H_{2n'}COR^2$ radical is $-CH_2CH_2SCH_2COR^2$.

18. A polysiloxane according to claim 17 wherein $R^2$ is methoxy.

19. A polysiloxane according to claim 17 wherein $R^2$ is $$-(OCH_2CH_2)_2OC_2H_5.$$

20. A polysiloxane according to claim 17 wherein $R^2$ is $$-(OCH_2CH_2)_x-OCH_3$$

wherein x has an average value of about 7.2.

21. A polysiloxane according to claim 17 wherein $R^2$ is $-N(CH_2CH_2OH)_2$.

22. In a process for the production of a polyurethane elastomer molding by the reaction injection molding of a reactant mixture comprising an organic polyisocyanate, at least one organic polyol and a difunctional extender in the presence of an internal release agent the improvement which comprises employing as the internal release agent a polysiloxane having the formula $$(R)_3SiO[(R)_2SiO]_m-\left[\underset{\underset{R^1CONR^5R^6}{|}}{RSiO}\right]_q-Si(R)_3$$

wherein R is selected from the group consisting of lower-alkyl and aryl, $R^1$ is a divalent hydrocarbon radical which may contain oxygen or sulfur atoms, $R^5$ and $R^6$ are independently selected from the group consisting of hydrogen, lower-alkyl, and the radical having the formula $$-(CH_2CHR^4O)_y-H$$

wherein $R^4$ is selected from the group consisting of hydrogen and methyl and y has an average value of from about 1 to about 4, m has an average value of from about 30 to about 150 and q has a value such that the unit which it characterizes represents about 1 to about 10 mole percent of the total polysiloxane.

23. A process according to claim 22 wherein R and $R^1$ are methyl and $-CH_2CH_2SCH_2-$ respectively and both $R^5$ and $R^6$ have the formula $$-(CH_2CH_2O)_y H$$

wherein y has an average value from about 1 to about 4.

* * * * *